United States Patent

[11] 3,529,504

| [72] | Inventors | Charles Du Bois Hagerty<br>Philadelphia, Pennsylvania;<br>Gerold Litschi, Lansdale, Pennsylvania |
|---|---|---|
| [21] | Appl. No. | 786,063 |
| [22] | Filed | Dec. 23, 1968 |
| [45] | Patented | Sept. 22, 1970 |
| [73] | Assignee | By mesne assignments, to<br>W. R. Grace & Co.,<br>New York, New York<br>a corporation of Connecticut |

[54] APPARATUS FOR STORING, SUPPLYING AND SEVERING
4 Claims, 7 Drawing Figs.

[52] U.S. Cl. .................................................. 83/464,
83/614, 83/649, 225/47, 242/68, 242/68.4
[51] Int. Cl. .................................................... B26d 7/02
[50] Field of Search ........................................ 83/649,
614, 455, 464; 225/47, 51, 85; 242/68, 68.4, 68.7, 78.7

[56] References Cited
UNITED STATES PATENTS

| 209,995 | 11/1878 | Walker | 83/464 |
| 546,607 | 9/1895 | Byrd | 83/464X |
| 1,039,344 | 9/1912 | Wilkinson et al. | 225/47 |
| 1,624,590 | 4/1927 | Fleming | 83/464X |
| 1,664,026 | 3/1928 | Farmer | 242/68 |
| 2,609,047 | 9/1952 | Wilkoff | 83/649X |
| 2,645,543 | 7/1953 | Mancini | 83/649X |
| 2,696,354 | 12/1954 | Novick | 242/68.4 |
| 2,947,492 | 8/1960 | Sarka | 242/78.7 |
| 3,385,149 | 5/1968 | Johnson | 83/649X |

Primary Examiner—Frank T. Yost
Attorneys—Eugene M. Bond and Kenneth E. Prince

ABSTRACT: The invention disclosed is directed to an apparatus including means for storing, supplying and severing plastic film. The apparatus includes elements for storing a supply roll of plastic film from which is received, unidirectionally, a strip of film which may be severed into sheets of a length as desired.

INVENTORS
CHARLES D. HAGERTY
GEROLD LITSCHI

BY Eugene M. Bond

ATTORNEY

INVENTORS
CHARLES D. HAGERTY
GEROLD LITSCHI

BY Eugene M. Bond

ATTORNEY

Patented Sept. 22, 1970
3,529,504
Sheet 4 of 4
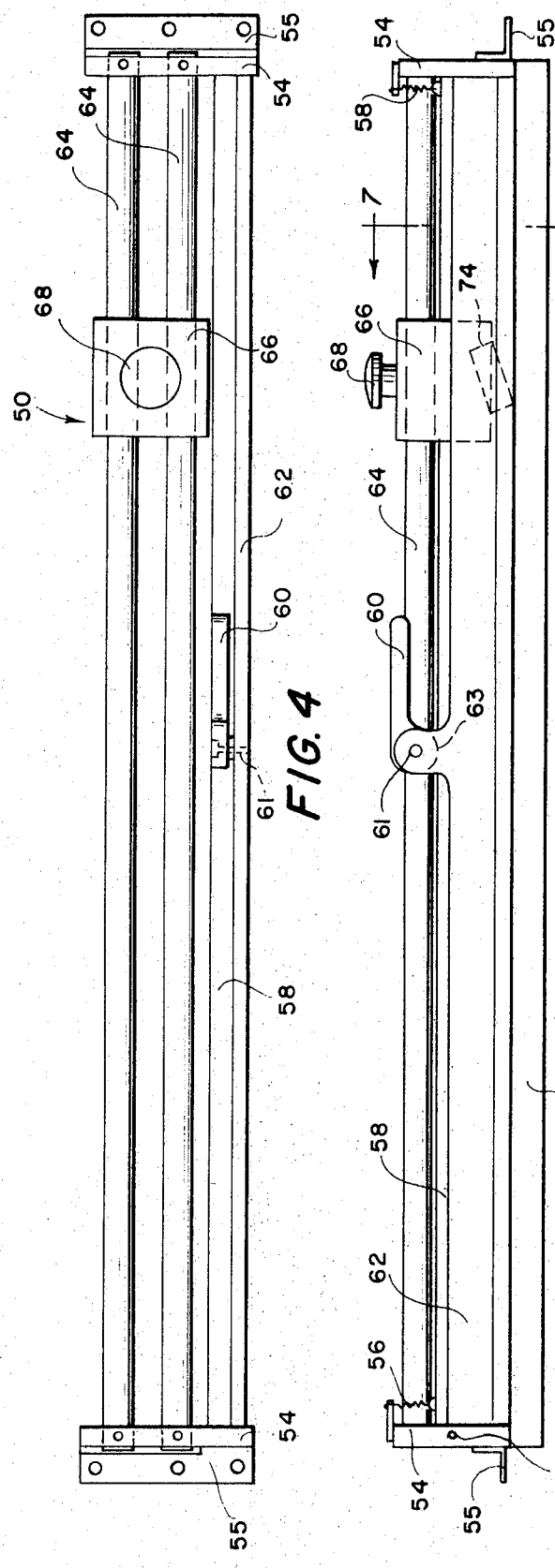
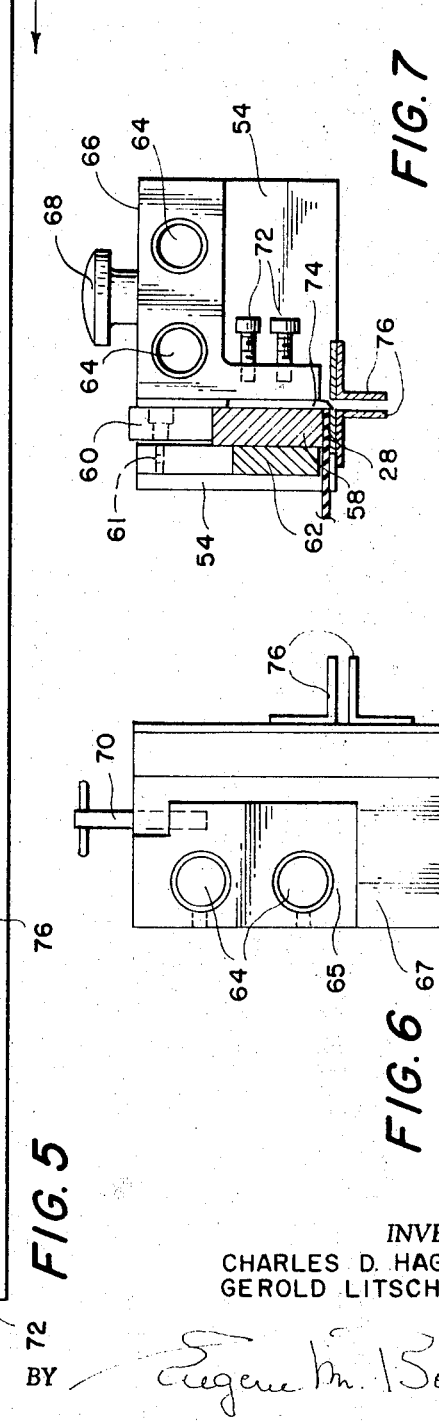
INVENTORS
CHARLES D. HAGERTY
GEROLD LITSCHI
BY Eugene M. Bond
ATTORNEY

APPARATUS FOR STORING, SUPPLYING AND SEVERING

This invention relates to an apparatus having means for storing, supplying and severing a sheet of plastic film from a supply roll. More particularly, the present invention provides an apparatus including a housing for storing a supply roll of plastic material, means for unidirectionally transferring a strip of plastic film from the supply roll to a severing station, and means for severing a length of plastic film from the transferred strip.

Numerous devices are available to the art for supplying a strip of material from a supply roll to a severing station where the material may be severed such as by tearing, by use of mechanical severing means, or the like. Typically, however, because of the physical characteristics of plastic materials the prior art devices have had little application to plastic materials. For example, where sheets of plastic material are of a thickness between about one and 20 mils, special severing elements are required which will retain the plastic material in flat position during severing to avoid binding. Typically, the prior art devices have not been versatile and have met with little commercial success. It has now been found that by the practice of the present invention an apparatus is provided which complies with the unique requirements for storing, supplying, and severing sheets of plastic material from a supply roll thereof. The present invention thus provides an apparatus which includes features of construction and combination of elements which overcome, in a practical and simple manner, many of the defects apparent in devices known to the art heretofore.

Generally stated, the present invention provides an apparatus including means for storing a supply roll of plastic material from which is unidirectionally received a strip of plastic film. The strip of plastic film from the supply roll is transferred to a severing station which includes means for holding the width of the film in a substantially flat plane during the severing operation. The present apparatus thus provides an apparatus which is versatile in operation, simple in construction, and readily adaptable to various widths of plastic materials. The storing means of the present invention desirably includes a frame or housing having support bearings by which a roll of supply plastic material may be readily rotated without substantial effort. Desirably, a platform is further included for receiving a new roll of plastic material into the storing area. The supply means include elements for directing a strip of plastic film from the supply roll unidirectionally and into a severing station where the plastic film may be cut to lengths as may be desired. The severing station includes a film holder and blade mechanism which may be passed over the film position thereunder for severing.

The present invention will become more apparent from the following detailed description taken in connection with the accompanying drawing wherein:

FIG. 4 is a top elevational view of the severing means of the apparatus of the present invention;

FIG. 5 is a front elevational view of the severing means of FIG. 4;

FIG. 6 is an end elevational view of FIG. 5 taken along the right side thereof with the illustrated figure 90° out of phase; and FIG. 7 is a sectional view taken along section line 7—7 of FIG. 5.

Figure 1:
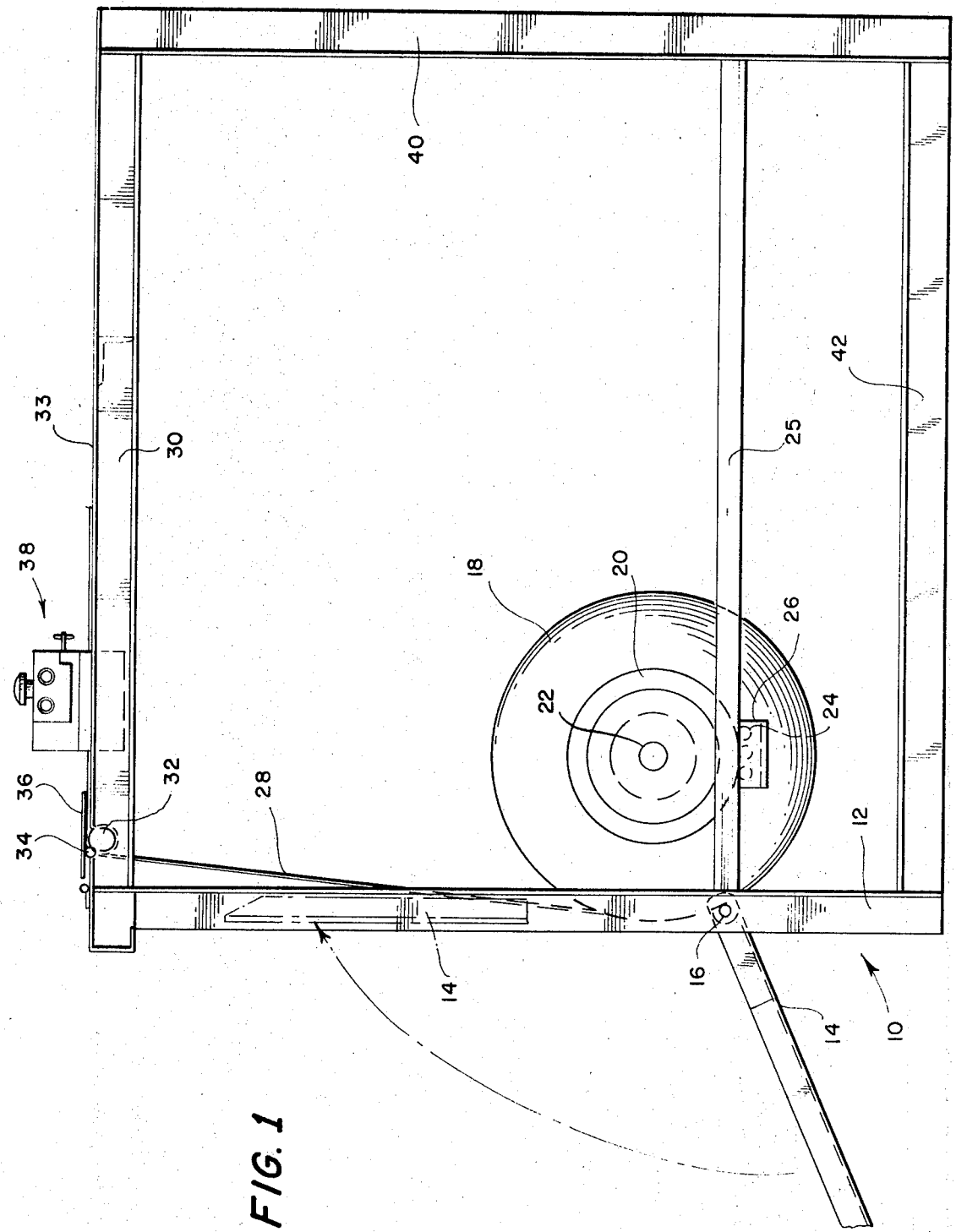
FIG. 1 illustrates a side elevational view of the apparatus of the present invention.

In the drawings wherein similar elements are referred to by similar numerals throughout the several views, FIG. 1 illustrates apparatus 10 having front vertical framing elements 12 and platform 14 pivotally mounted by pin 16 to vertical frame elements 12. Platform 14 usefully serves as a ramp up which may be rolled a supply roll of plastic material 18 which may be supported and rotated by wheel 20 on support bearings 24 within housing 26 secured to horizontal framing element 25. A strip of plastic film 28 received from supply roll 18 is passed to horizontal support platform 30 between pinch rolls 32 and 34 held thereby which permit travel of film 28 unidirectionally thus preventing return of film 28 by the counterweight thereof to supply roll 18. Desirably, removable or pivotal cover plate 36 is further included over pinch rolls 32 and 34 to prevent or limit foreign materials from entering the pinch roll system. Severing means 38 is disposed on horizontal platform 30 and serves for severing a length or sheet of plastic film received from supply roll 18. The severing means is described in detail hereafter.

Apparatus 10 further includes vertically disposed back framing elements 40 and base framing elements 42 completing the frame network of the apparatus. Additional support elements may be included in the construction of apparatus 10 as may be desired.

Figure 2:
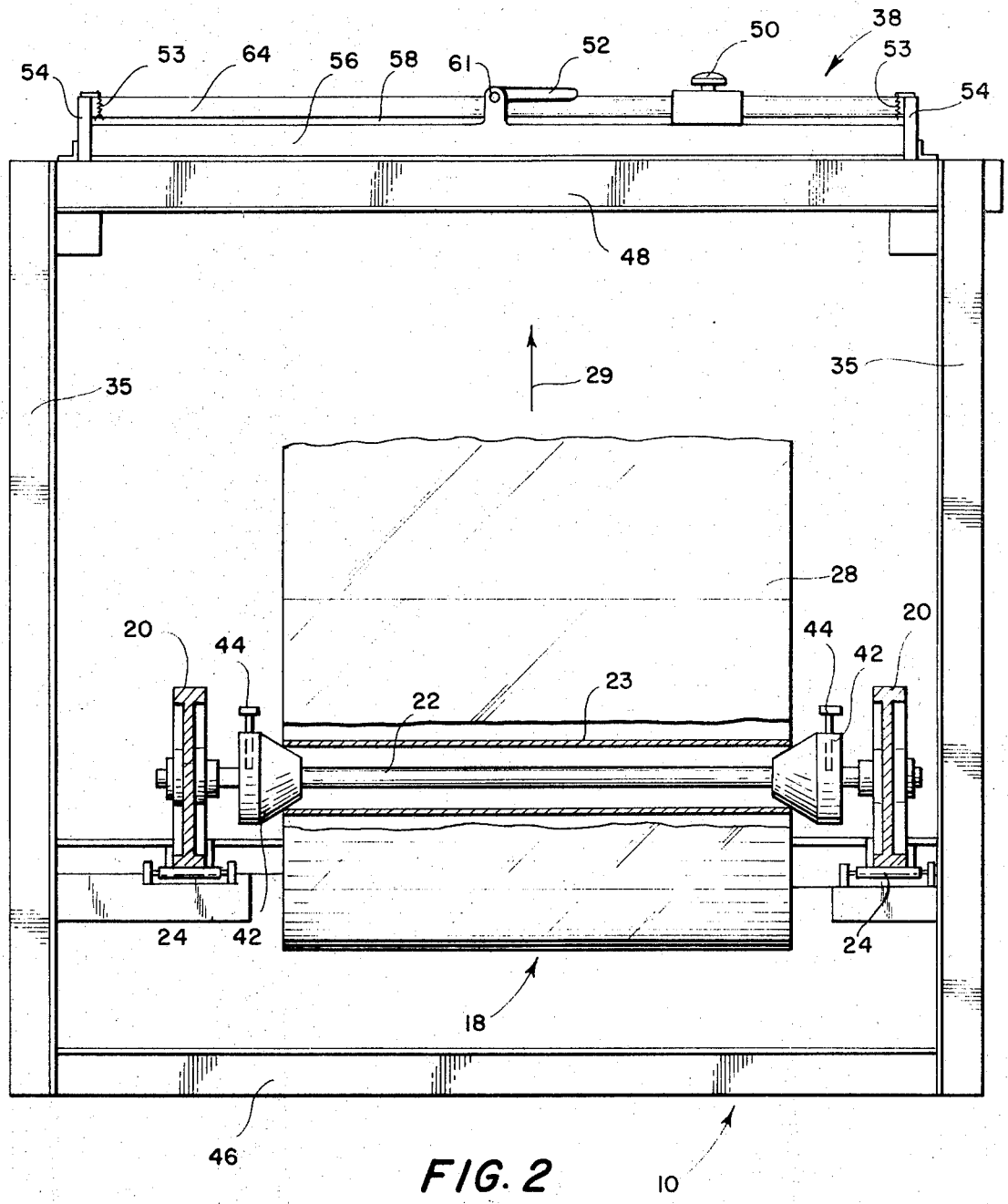
FIG. 2 is a front elevational view of the apparatus of the present invention.

FIG. 2 illustrates a front elevational view of apparatus 10 and more clearly illustrates the relative association of support wheels 20, supporting rod 22 forming an axle about which supply roll 18 with core 23 may rotate. Supply roll 18 is fixed in position about axle 22 by positioning blocks 42 held in fixed positions to axle 22 by securing pins 44. Apparatus 10 further includes horizontally disposed frame elements 46 and 48 joining vertically disposed framing element 35.

Supply roll 18 may be mounted about axle 22 by removing wheel 20 and positioning adjustable block 42 from the axle which is then inserted through core 23 which may vary in diameter for each new supply roll of plastic material. Thereafter, the block 42 may be returned to mounting position and fixed in position by pin 44 which may be a bolt, or related means for securely gripping the block to the axle. With blocks 42 in position, wheel 20 is positioned and then the roll having associated elements in position may be rolled up ramp 14 and into rotating position on bearings 26 within housing 24.

A substantially continuous strip of plastic received from supply roll 18 is transferred in the direction of arrow 29 to the severing station 38 which includes a manually operated plastic film severing block 50 disposed on rail 64. Rails 64 may be supported by vertically disposed support elements 54 which may include a spring 53 for returning pressure plate 58. Pressure plate 58 usefully serves to rigidly press the plastic strip against support platform 30 along the entire width of the film and thereby prevents binding of the film during the severing operation. Pressure plate 58 may be moved to pressure supplying position by handle 52 pivotally mounted by pin 61 to support plate 56 which engages vertically disposed support elements 54 at either end thereof while providing a spacing over the support platform 30 through which a strip of plastic material 28 may be received.

Figure 3:
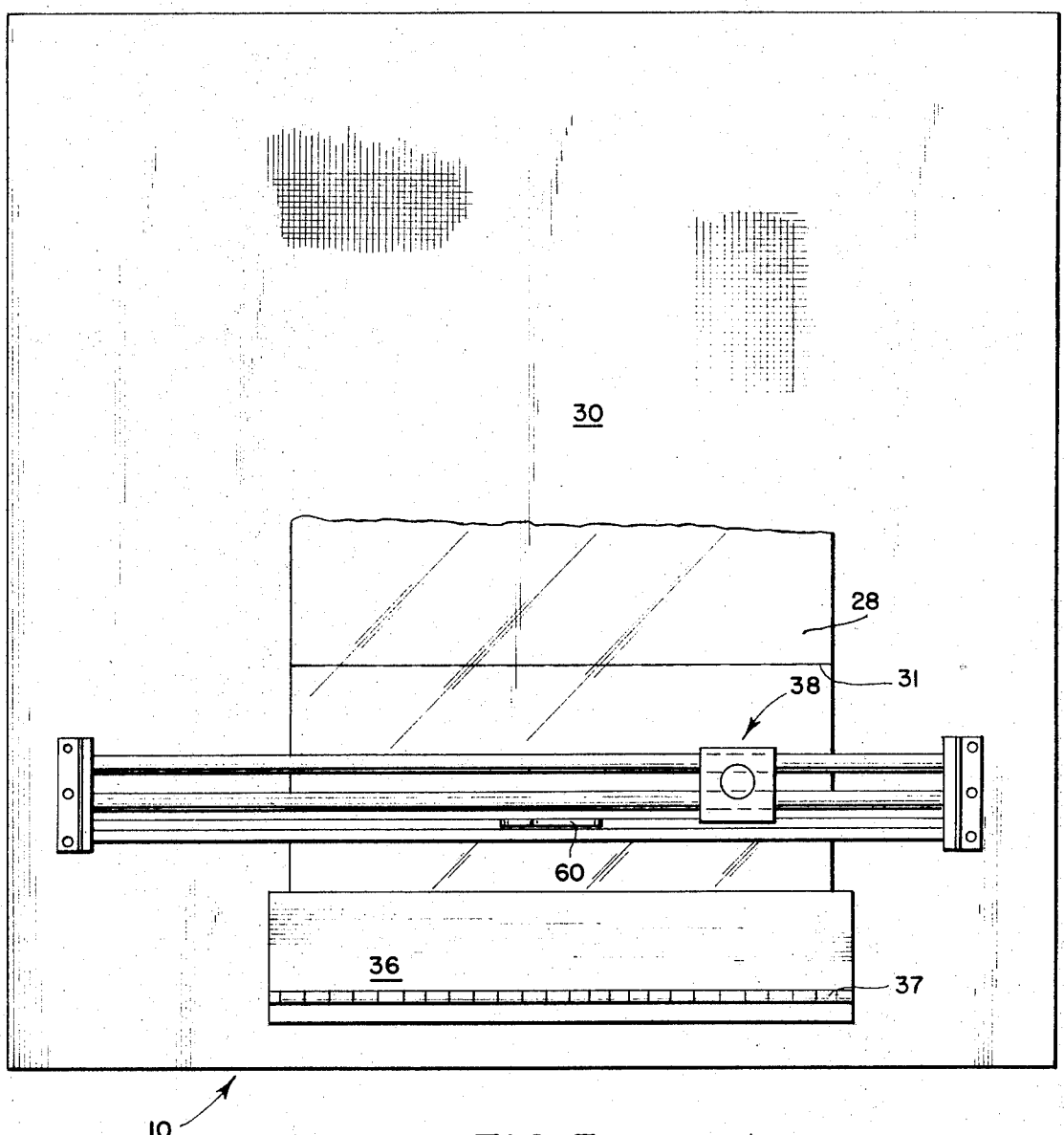
FIG. 3 is a top elevational view of the present apparatus.

FIG. 3 further illustrates as a top elevational view apparatus 10 having plate 36 beneath which is received strip 28. Plastic strip 28 may be severed along line 31 desirably in either direction, as illustrated, by severing means 38. If desired, means for measuring lengths of plastic sheets may be included on platform 30 to serve as a convenient means for determining the length of the plastic sheet to be severed. Desirably, plate 36 is hinged as illustrated by hinge element 37 for providing a convenient means for initially positioning plastic strip 28 between the pinch roll elements covered by plate 36.

FIGS. 4—5 illustrate the severing means of the present invention. The severing means 38 include vertically disposed support plates 54 joined to L-shaped retaining elements 55 which may be conveniently secured to the support surface 30 of apparatus 10. Severing block 50 may include handle 68 and may be designed to travel over rail block 66. Rail block 66 is slidably mounted on rails 64 which are illustrated as rod elements positioned between vertically disposed plates 54. Also disposed within vertically positioned plates 54 is plate 62 rigidly secured in position for supporting handle 60 pivotally mounted thereto by pin 61. Handle 60 includes an eccentric member 63 which on rotation forces pressure plate 58 downward and against a strip of film disposed within a provided opening. Rotation of handle 60 about pin 61 to the vertical position releases plate 58 and by the action of springs 56, plate 58 is returned to normal position thus permitting strip 28 to be readily slidable thereunder. Channeling elements 76 provide a guide means wherein may be received severing element 74 illustrated as a blade with both exposed edges sharpened to insure complete severing through the thickness of the sheet of plastic film.

FIGS. 6—7 further illustrate elements of severing means 38. In FIG. 6, removable pin 70 is shown which upon removal permits rail elements 64 and associated members to be pivoted about pivotal pin 72 thus providing a convenient means for replacing a worn severing or blade element. The severing or blade element 74 or FIG. 7 may be retained in position by screws 72. FIG. 7 more clearly illustrates the fashion in which pressure plate 58 retains film 28 in position during the severing step by blade 74 which is passed therethrough by manipulation of handle elements 68 passing rail block 66 over rail elements 64. Plate 58 is secured in position by handle 60 mounted on position by pin 61 to fixed plate 62.

The apparatus of the present invention may usefully serve to provide a base layer for preparing printing plates of a photocurable composition.

A convenient method of preparing such printing plates is to place an image-bearing, line or halftone, stencil or positive or negative tranparency parallel to the surface of a layer of a photocurable composition which has been cast directly on the plastic support sheet. The photocurable layer is exposed through the transparency to a source of actinic light, preferably a point or collimated light source when a liquid photocurable composition is used, until the layer is cured or polymerized to an insoluble stage in the exposed areas. The thickness of the ultimate relief in such a method may be controlled by varying the thickness of the layer of the composition. The surface network of the composition layer of the resulting lamination includes areas of liquid uncured composition and areas of insolubilized photocured composition. The liquid areas are next removed by immersion of the lamination in an aqueous solution. Thereafter, the photocured printing plate is washed in a spray of water and dried in an air dryer. Following the drying operation, the resulting lamination may then be used as desired.

The plastic film processed in the present apparatus may vary in thickness and in composition. A desirable thickness of film is from about one to about 20 mils as desired. The composition of the plastic may vary but desirably is a Mylar type material which usefully serves as a support or base because of high strength properties for use in preparation of flexible printing plates.

It will be apparent from the foregoing that the present apparatus provides great versatility, great efficiency in storing, supplying and severing flexible plastic films, and simplicity of construction affording use without any degree of modification.

The various elements of the present apparatus unless otherwise indicated may be secured to adjoining elements by any suitable means such as bolts, welding, rivots or the like. In addition, auxiliary support for reinforcement members may also be included as part of the device as may be required.

Although a preferred embodiment of the present invention has been illustrated herein, it is to be understood that various changes and modifications may be made in the construction and arrangement of elements without departing from the spirit and scope of the invention as defined.

We claim:

1. An apparatus which comprises, in combination, means for storing a supply roll of plastic material which includes bearing elements on which the supply roll may be rotated, an axle disposed through the core of the supply roll, said axle having adjustable block members for holding rolls of different core sizes in a fixed position on the axle and further including wheel members near each end of the axle for rotation on said bearing elements disposed thereunder, means for directing unidirectionally a strip of plastic film from said supply roll, and severing means for cutting a sheet of plastic material from said strip, said severing means including for operation therewith a pressure bearing element for positioning traverse the strip of plastic material and for holding the strip of plastic material in fixed position during the severing thereof.

2. The apparatus of claim 1 wherein said severing means includes a severing block supporting a blade element and slidable on rails disposed traverse the direction of travel of the strip of plastic material.

3. The apparatus of claim 2 wherein a pressure plate is included for retaining the strip of plastic material in fixed position during severing, said pressure plate being spring returnable to normal plastic disengaging position and positionable in plastic retaining position by a manually operated handle having an eccentric member which forces the pressure plate into plastic strip engaging position.

4. The apparatus of claim 1 wherein said strip of plastic material passes through pinch rolls which limit the direction of travel to a positive direction and restrict return to the supply roll.